United States Patent
Uhrlandt et al.

(12)

(10) Patent No.: US 6,180,076 B1
(45) Date of Patent: Jan. 30, 2001

(54) READILY DISPERSIBLE PRECIPITATED SILICA

(75) Inventors: Stefan Uhrlandt, Cologne; Mustafa Siray, Bonn; Anke Blume; Burkhard Freund, both of Erftstadt, all of (DE)

(73) Assignee: Degussa-Huls AG, Frankfurt Am Main (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/153,232

(22) Filed: Sep. 15, 1998

(30) Foreign Application Priority Data

Sep. 15, 1997 (DE) .............................. 197 40 440

(51) Int. Cl.$^7$ .............................. C01B 33/12; C08K 3/00
(52) U.S. Cl. .......................... 423/335; 423/338; 524/493
(58) Field of Search .................................... 423/335, 338; 524/492, 493

(56) References Cited

U.S. PATENT DOCUMENTS

| 4,495,167 | 1/1985 | Nauroth . |
| 4,590,052 | 5/1986 | Chevallier . |
| 5,227,425 | 7/1993 | Rauline . |
| 5,403,570 | 4/1995 | Chevallier . |
| 5,484,581 | 1/1996 | Esch . |
| 5,705,137 | 1/1998 | Gorl . |
| 5,846,506 | 12/1998 | Esch . |
| 5,851,502 | 12/1998 | Turk . |
| 5,871,867 | 2/1999 | Rausch . |
| 5,925,708 | 7/1999 | Esch . |

FOREIGN PATENT DOCUMENTS

| 44 23 493 A1 | 2/1995 | (DE) . |
| 0 157 703 | 10/1985 | (EP) . |
| 0 396 450 A1 | 11/1990 | (EP) . |
| 0 501 227 A1 | 9/1992 | (EP) . |
| 0 520 862 | 12/1992 | (EP) . |
| 0 520 862 A1 | 12/1992 | (EP) . |
| 0 647 591 | 4/1995 | (EP) . |
| 0 647 591 A1 | 4/1995 | (EP) . |
| 0 745 558 A2 | 12/1996 | (EP) . |
| 0 754 650 A1 | 1/1997 | (EP) . |
| 0 755 899 A2 | 1/1997 | (EP) . |

*Primary Examiner*—Edward J. Cain
(74) *Attorney, Agent, or Firm*—Pillsbury Madison & Sutro LLP

(57) ABSTRACT

Precipitated silica, having the following physico-chemical parameters:

| BET surface area | 120–300 m$^2$/g |
| CTAB surface area | 100–300 m$^2$/g |
| BET/CTAB ratio | 0.8–1.3 |
| Sears index (consumption of 0.1 N NaOH) | 6–25 ml |
| DBP index | 150–300 g/100 g |
| wk coefficient | <3.4 |
| Particle size of the degraded particles | <1.0 μm |
| Particle size of the non-degradable particles | 1.0–100 μm |

The precipitated silica is prepared by a process in which an alkali metal silicate (preferably soda water-glass) is reacted with mineral acids (preferably sulfuric acid) at temperatures of 60–95° C. at a pH of 7.0–11.0 with continuous stirring, the reaction is continued up to a solids concentration of 40 g–110 g, the pH is adjusted to a value between 3 and 5, and the precipitated silica is filtered off, washed, then dried and, if appropriate, ground or granulated. The precipitated silica is employed as a filler in vulcanizable mixtures for the production of tires.

15 Claims, 6 Drawing Sheets

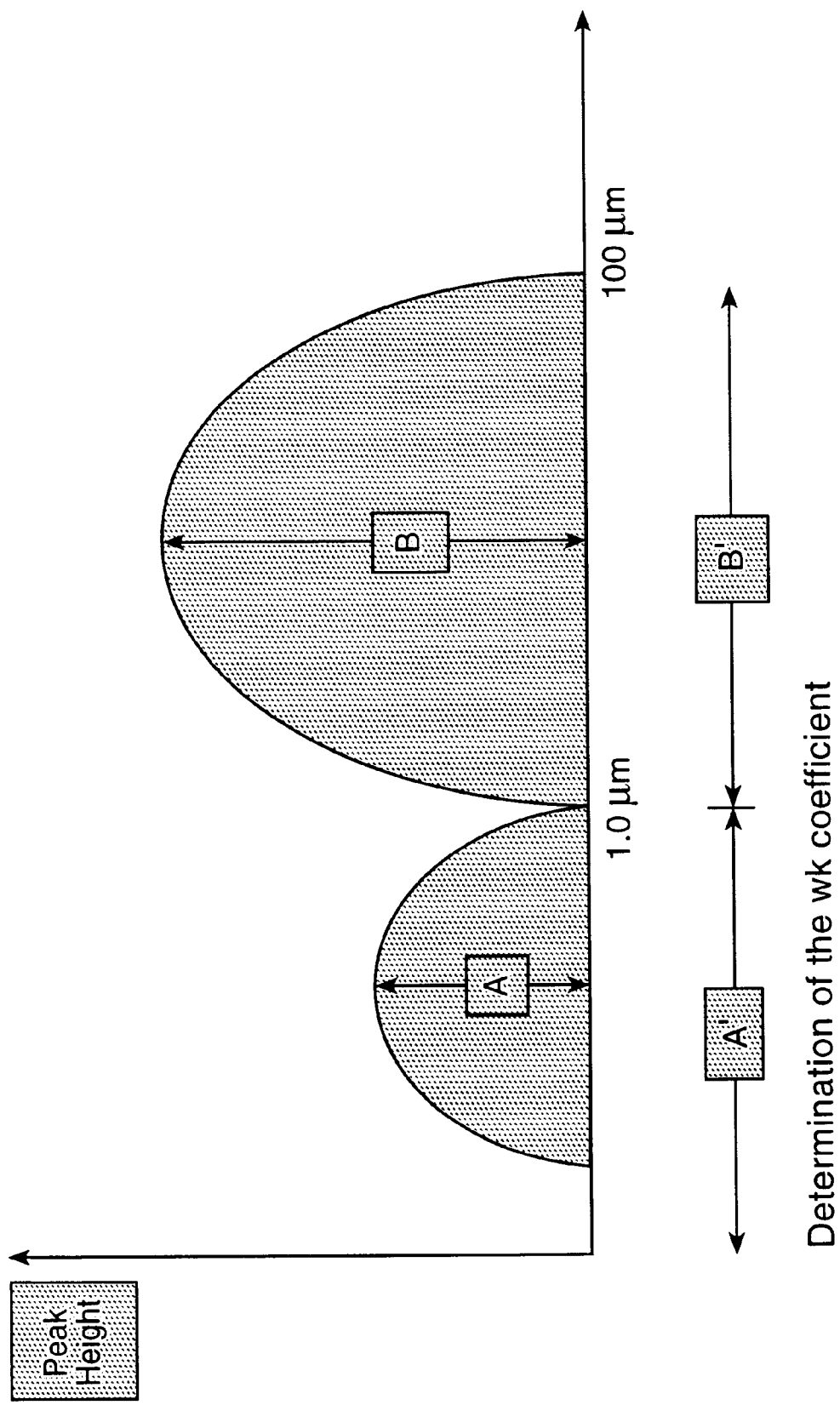

READILY DISPERSIBLE PRECIPITATED SILICA

FIELD OF THE INVENTION

The invention relates to a readily dispersible precipitated silica, the process for its preparation and its use in rubber mixtures.

BACKGROUND OF THE INVENTION

It is known to incorporate precipitated silicas into rubber mixtures (S. Wolff, Kautschuk und Gummikunstst. 7 (1988) p. 674). For use in rubber mixtures, precipitated silicas must be readily dispersible. A poor dispersibility is often the reason why precipitated silicas are not employed in tire mixtures, especially with high filler contents.

The document EP-A 0 520 862 discloses precipitated silicas which are employed as a filler in rubber mixtures for tires.

The document EP-A 0 157 703 discloses a precipitated silica which can be prepared in accordance with the document EP-A 0 501 227.

The known precipitated silicas have the disadvantage that they have a poor dispersion.

EP-A 0 647 591 and EP-A 0 157 703 describe a precipitated silica which has an improved dispersion compared with the above mentioned precipitated silicas. Due to increased requirements by the tire industry, even the improved dispersion of this precipitated silica is no longer adequate for use in tire mixtures.

SUMMARY OF THE INVENTION

There was thus the object of developing a precipitated silica which can be dispersed significantly better in rubber mixtures.

The invention provides a precipitated silica, characterized by the following physico-chemical data:

| | |
|---|---|
| BET surface area | 120–300 m$^2$/g |
| CTAB surface area | 100–300 m$^2$/g |
| BET/CTAB ratio | 0.8–1.3 |
| Sears index (consumption of 0.1 N NaOH) | 6–25 ml |
| DBP index | 150–300 g/100 g |
| wk coefficient | <3.4 |
| Particle size of the degraded particles | <1.0 μm |
| Particle size of the non-degradable particles | 1.0–100 μm |

The physico-chemical data are determined by the following methods:

| | |
|---|---|
| BET surface area | Areameter, Ströhlein, in accordance with ISO 5794/Annex D |
| CTAB surface area | at pH 9, in accordance with Jay, Janzen and Kraus in "Rubber Chemistry and Technology" 44 (1971) 1287 |
| Sears index | in accordance with G.W. Sears, Analyt. Chemistry 12 (1956) 1982 |
| DBP index | ASTM D 2414-88 |
| wk coefficient | Cilas Granulometer 1064 L |

In a particularly preferred embodiment, the precipitated silica according to the invention can have the following physico-chemical data:

| | |
|---|---|
| BET surface area | 120–200 m$^2$/g |
| CTAB surface area | 100–200 m$^2$/g |
| BET/CTAB ratio | 0.8–1.3 |
| Sears index (consumption of 0.1 N NaOH) | 6–25 ml |
| DBP index | 150–300 g/100 g |
| wk coefficient | <3.4 |
| Particle size of the degraded particles | <1.0 μm |
| Particle size of the non-degradable particles | 1.0–30 #m |

The precipitated silica according to the invention has a particle size distribution which ensures a very good dispersion after incorporation into rubber mixtures. A very low wk coefficient is characteristic of a very good dispersion.

The invention also provides a process for the preparation of the precipitated silica having the following physico-chemical parameters:

| | |
|---|---|
| BET surface area | 120–300 m$^2$/g |
| CTAB surface area | 100–300 m$^2$/g |
| BET/CTAB ratio | 0.8–1.3 |
| Sears index (consumption of 0.1 N NaOH) | 6–25 ml |
| DBP index | 150–300 g/100 g |
| wk coefficient | <3.4 |
| Particle size of the degraded particles | <1.0 μm |
| Particle size of the non-degradable particles | 1.0–100 μm | which is characterized in that an alkali metal silicate is reacted with mineral acids at temperatures of 60–95° C. at a pH of 7.0–11.0 with continuous stirring, the reaction is continued up to a solids concentration of 40 g/l–110 g/l, the pH is adjusted to a value between 3 and 5, and the precipitated silica is filtered off, washed and then dried, and if appropriate ground or granulated.

In one embodiment of the invention, the addition of the acid and of the water-glass can be interrupted for 30 to 90 minutes and then continued.

In one embodiment of the invention, the solids concentration can be less than 80 g/l and/or the temperature can be less than 80° C. and/or the precipitation time can be less than 76 minutes and/or the precipitation can be interrupted and/or a dilute or concentrated mineral acid can be employed.

In a further preferred embodiment, commercially available soda water-glass (modulus 3.2–3.5) can be reacted with sulfuric acid at a pH of between 7.5 and 10.5, some of the soda water-glass already being added to the initial mixture to adjust the pH. Simultaneous addition of water-glass and sulfuric acid is maintained over a period of up to 120 minutes, it being possible for the addition to be interrupted for 30 to 90 minutes in a particularly preferred form. The mixture can then be acidified to pH 3–5, filtered, washed and dried. To achieve a particularly good dispersibility, the simultaneous addition of soda water-glass and sulfuric acid preferably takes place for between 40–90 minutes. The surface area of the silica can be established here via the duration of the precipitation. In a particularly preferred form, the precipitated silicas can be subjected to flash drying, it being possible for the precipitated silica to be filtered off, washed and redispersed.

In one embodiment of the invention, the following conditions can be maintained for the preparation of a precipitated silica having a BET surface area of 120 to 140 m²/g and a WK coefficient of less than 3.4:

| | |
|---|---|
| Solids concentration: | 68 to 85 g/l |
| Temperature: | 74 to 82° C. |
| pH: | 8 to 9, preferably 8.5 |

1. Addition of water-glass and sulfuric acid over a period of 15 to 25 minutes,
2. Interruption of the addition for 30 to 90 minutes,
3. Addition of water-glass and sulfuric acid over a period of 50 to 70 minutes, where the total precipitation time can be 130 to 140 minutes.

In another preferred embodiment of the invention, the following conditions can be maintained for the preparation of a precipitated silica having a BET surface area of 140 to 160 m²/g and a WK coefficient of less than 3.4:

Solids concentration: 40 to 60 g/l

Temperature: 88 to 96° C.

pH: 7 to 9, preferably 7.5 to 8

Addition of water-glass and sulfuric acid over a period of 38 to 50 minutes.

In another preferred embodiment of the invention, the following conditions can be maintained for the preparation of a precipitated silica having a BET surface area of 160 to 180 m²/g and a WK coefficient of less than 3.4:

Solids concentration: 68 to 84 g/l

Temperature: 59 to 65° C.

pH: 8 to 9, preferably 8.5

Addition of water-glass and sulfuric acid over a period of 150 to 170 minutes.

In another preferred embodiment of the invention, the following conditions can be maintained for the preparation of a precipitated silica having a BET surface area of 180 to 200 m²/g and a WK coefficient of less than 3.4:

Solids concentration: 74 to 94 g/l

Temperature: 75 to 83° C.

pH: 8 to 10

Addition of water-glass and sulfuric acid over a period of 60 to 70 minutes.

In another preferred embodiment of the invention, the following conditions can be maintained for the preparation of a precipitated silica having a BET surface area of 200 to 300 m²/g, preferably 200 to 240 m²/g, and a WK coefficient of less than 3.4:

solids concentration: 70 to 110 g/l

Temperature: 60 to 76° C.

pH: 8 to 10, preferably 9

Addition of water-glass and sulfuric acid over a period of 60 to 86 minutes.

The precipitated silica according to the invention can be modified with organosilanes of the formulae I to III:

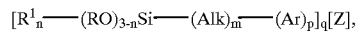

(I)

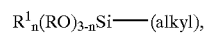

(II)

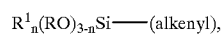

(III)

in which the symbols denote:

Z: —SCN, —SH, —Cl, —NH₂ (if q=1) or —Sx—(if q=2),

R and R¹: an alkyl group having 1 to 4 carbon atoms, the phenyl radical, wherein all the radicals R and R¹ can each have the same or a different meaning, R: a $C_1$–$C_4$-alkyl, $C_1$$C_4$-alkoxy group, n: 0; 1 or 2, Alk: a divalent straight-chain or branched hydrocarbon radical having 1 to 6 carbon atoms, m: 0 or 1, Ar: an arylene radical having 6 to 12 C atoms, preferably 6 C atoms, p: 0 or 1, with the proviso that p and n do not simultaneously denote 0, x: a number from 2 to 8, alkyl: a monovalent straight-chain or branched unsaturated hydrocarbon radical having 1 to 20 carbon atoms, preferably 2 to 8 carbon atoms, alkenyl: a monovalent straight-chain or branched unsaturated hydrocarbon radical having 2 to 20 carbon atoms, preferably 2 to 8 carbon atoms.

The modification with organosilanes can be carried out in mixtures of 0.5 to 50 parts, based on 100 parts of silica, in particular 2 to 15 parts, based on 100 parts of precipitated silica, it being possible for the reaction between the precipitated silica and silane to be carried out during the preparation of the mixture (in situ) or externally (premodification).

In a preferred embodiment of the invention, bis(triethoxysilyl-propyl)-tetrasulfane is employed as the silane.

The precipitated silica according to the invention can be mixed into vulcanizable rubber mixtures as a reinforcing filler in amounts of 5 to 200 parts, based on 100 parts of rubber, as a powder, microbeads or granules, both with silane modification and without silane modification.

The addition of one or more of the above mentioned silanes to the rubber mixture can be carried out together with the silicas according to the invention, the reaction between the filler and silane proceeding during the mixing process at elevated temperatures (in situ modification), or in an already premodified form (for example in accordance with DE-PS 40 04 781), that is to say the two reaction partners are reacted outside the actual preparation of the mixture.

Another mixture comprises modifying the precipitated silicas with organosilanes in mixtures of 0.5 to 50 parts, based on 100 parts of precipitated silica, in particular 2 to 15 parts, based on 100 parts of precipitated silica, the reaction between the precipitated silica and organosilane being carried out during the preparation of the mixture (in situ) or externally by spraying on and subsequent heat treatment of the mixture, or by mixing the silane and the silica suspension with subsequent drying and heat treatment.

In addition to mixtures which comprise exclusively the silicas according to the invention, with and without organosilanes according to formula I to III, as fillers, the rubber mixtures can additionally have a filler content of one or several more or less reinforcing fillers. A blend between carbon blacks (for example furnace, gas, flame and acetylene blacks) and the silicas according to the invention, with and without silane, and also between naturally occurring fillers, such as, for example, clays, silica chalks or other commercial silicas, and the silicas according to the invention would primarily be customary here.

The ratio in the blend also depends here, as with the metered amount of the organosilanes, on the profile of properties to be achieved in the finished rubber mixture. A ratio of 5–95% can be maintained between the silicas according to the invention and the other above mentioned fillers. In addition to the silicas according to the invention, the organosilanes and other fillers, the elastomers form a further important constituent of the rubber mixture. The silicas according to the invention can be employed in all types of rubbers which can be crosslinked with accelerators/sulfur, and also peroxidically. There would be mentioned here elastomers, naturally occurring and synthetic, possibly extended with oil, as an individual polymer or blend with other rubbers, such as, for example, natural rubbers, butadiene rubbers, isoprene rubbers, butadiene/styrene rubbers, in particular SBR, prepared by means of the solution polymerization process, butadiene/acrylonitrile rubbers, butyl rubbers, terpolymers of ethylene, propylene and non-conjugated dienes. The following additional rubbers are furthermore possible for rubber mixtures with the rubbers mentioned: carboxyl rubbers, epoxide rubbers, trans-polypentenamer, halogenated butyl rubbers, rubbers of 2-chloro-butadiene, ethylene/vinyl acetate copolymers, ethylene/propylene copolymers, optionally also chemical derivatives of natural rubber and modified natural rubbers.

The conventional further constituents, such as plasticizers, stabilizers, activators, pigments, anti-ageing agents and processing auxiliaries, in the conventional metered amounts are also known.

The silicas according to the invention, with and without silane, are employed in all rubber applications, such as, for example, tires, conveyor belts, seals, V-belts, hoses, shoe soles etc. The precipitated silica according to the invention can moreover be employed in battery separators, in silicone rubber and as a silica support.

BRIEF DESCRIPTION OF THE DRAWINGS

FIG. 6 shows, graphically, the wk coefficient.

DETAILED DESCRIPTION OF THE PREFERRED EMBODIMENTS

EXAMPLES

To achieve a good profile of values in a polymer mixture, the dispersion of precipitated silica in the matrix, the polymer, is of decisive importance. It has been found that the wk coefficient is a measure of the dispersibility of a precipitated silica.

The wK coefficient is determined as follows: The measurement is based on the principle of laser diffraction. The measurement is performed using a CILAS Granulometer 1064 L. For the determination, 1.3 g of the precipitated silica is transferred into 25 ml water and treated with ultrasound at 100 W (90% pulsed) for 4.5 minutes. Thereafter, the solution is transferred to the measuring cell and treated with ultrasound for a further minute. The detection with the aid of two laser diodes at different angles to the sample is carried out during the ultrasonic treatment. The laser beams are diffracted in accordance with the principle of diffraction of light. The diffraction pattern formed is evaluated with the aid of a computer. The method enables the particle size distribution to be determined over a wide measurement range (approx. 40 nm–500 µm).

An essential point here is that the energy introduced by ultrasound represents a simulation of the energy introduced by mechanical forces in the kneaders of the tire industry.

Figure 1:
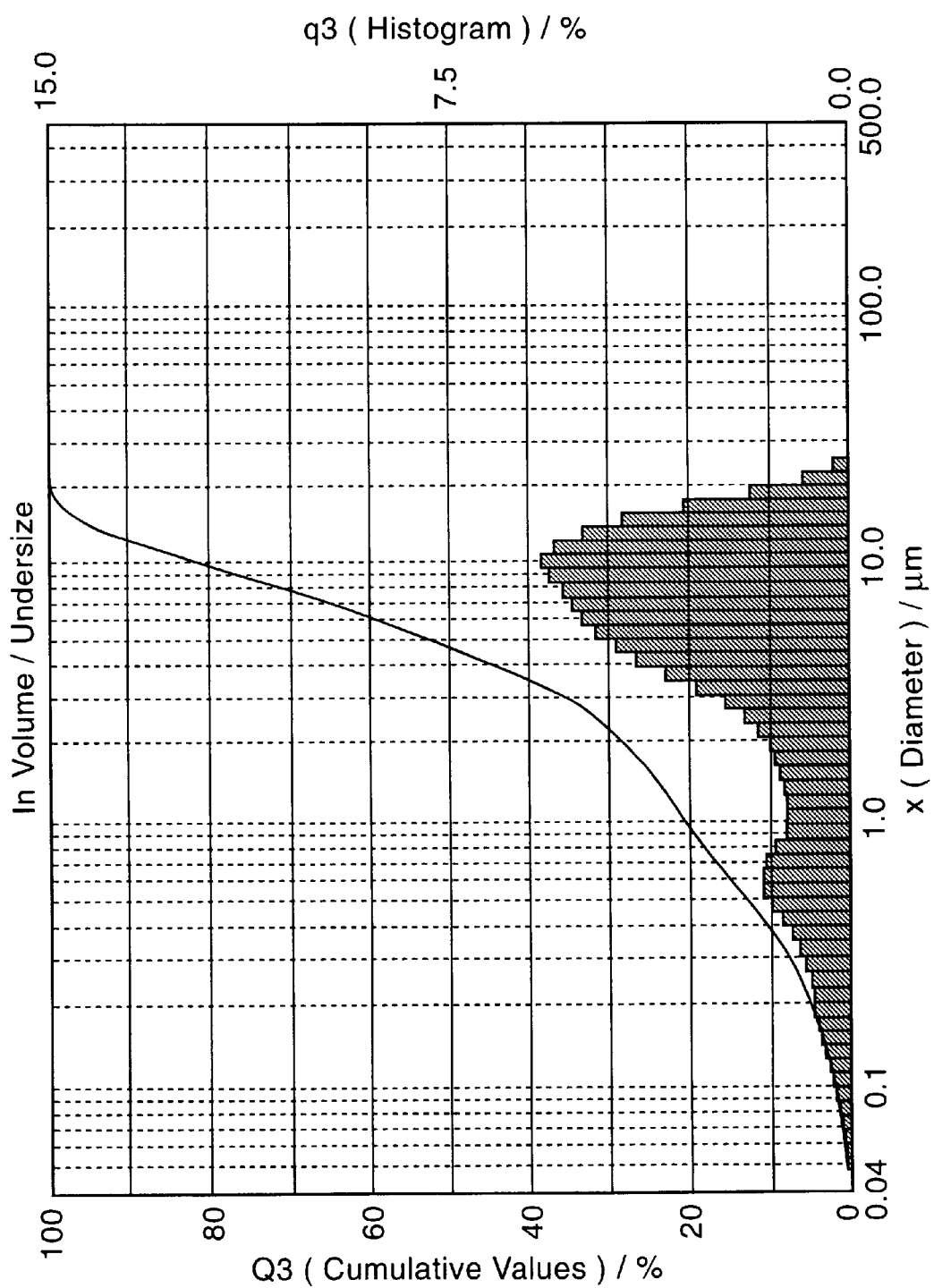
FIG. 1 shows, graphically, the result of measurement of Ultrasil 3380 by the laser diffraction method.
Figure 2:
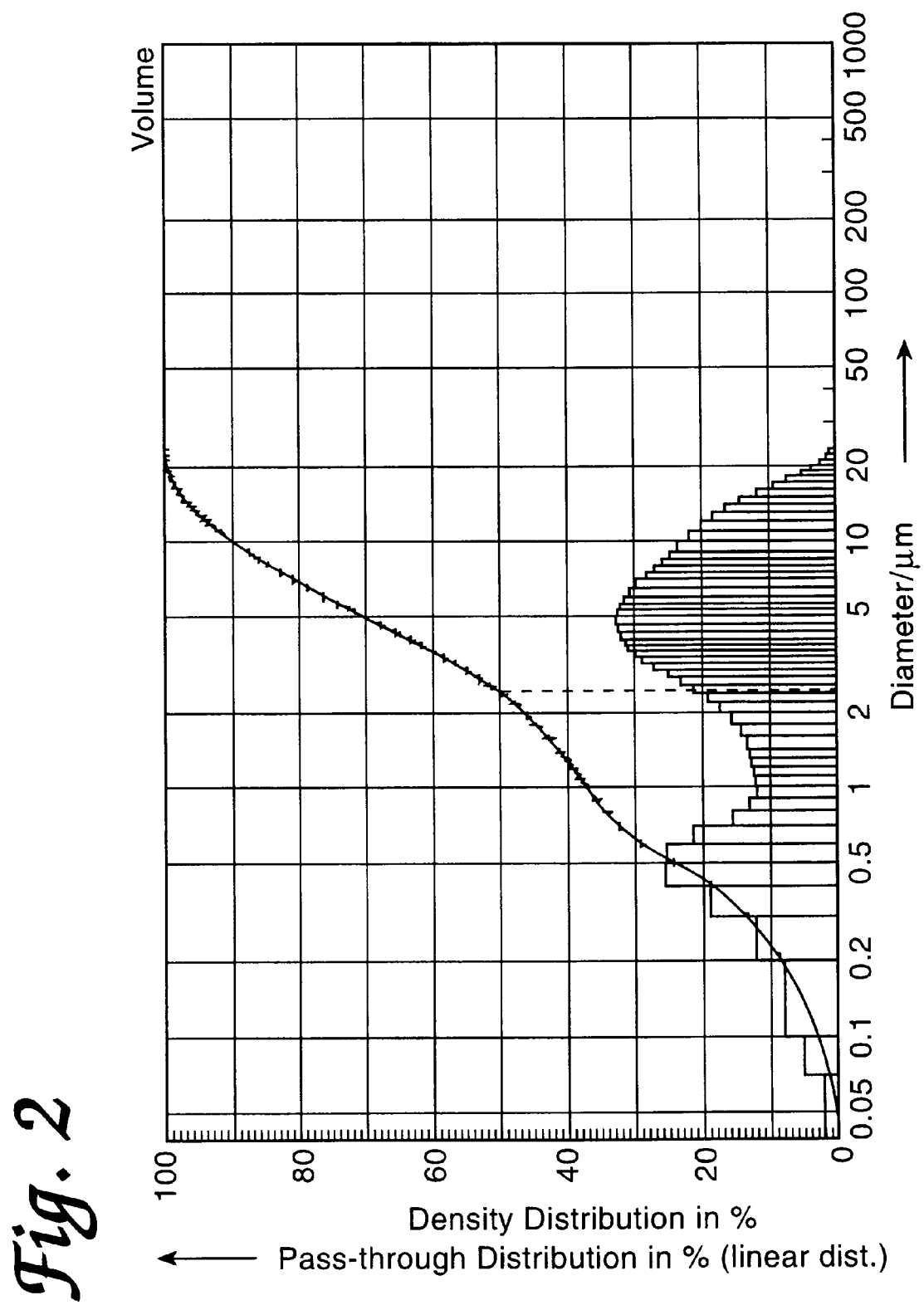
FIG. 2 shows, graphically, the result of measurement of silica according to the invention of Example 3 by the laser diffraction method.
Figure 3:
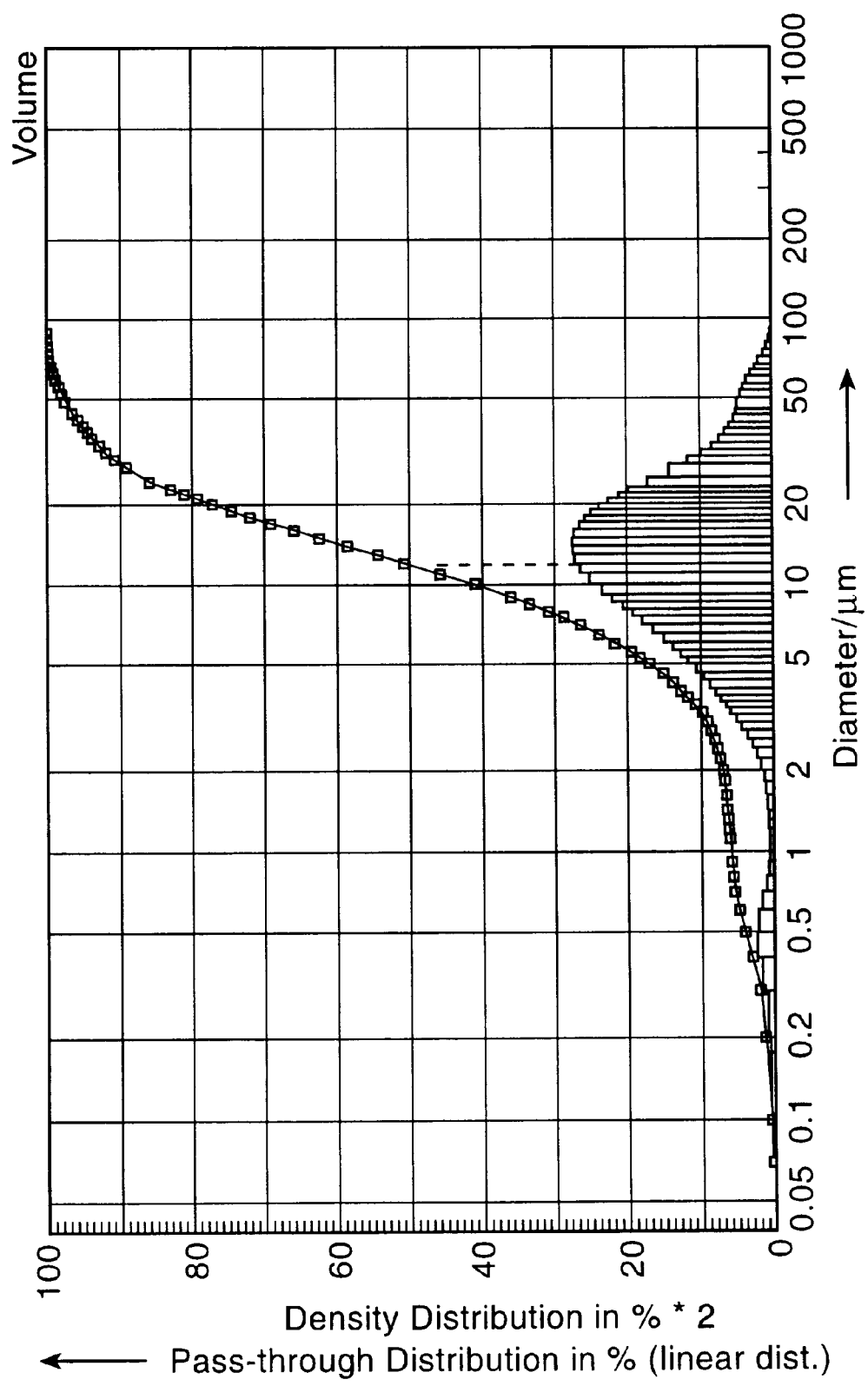
FIG. 3 shows, graphically, the result of measurement of Ultrasil VN 3 by the laser diffraction method.
Figure 4:
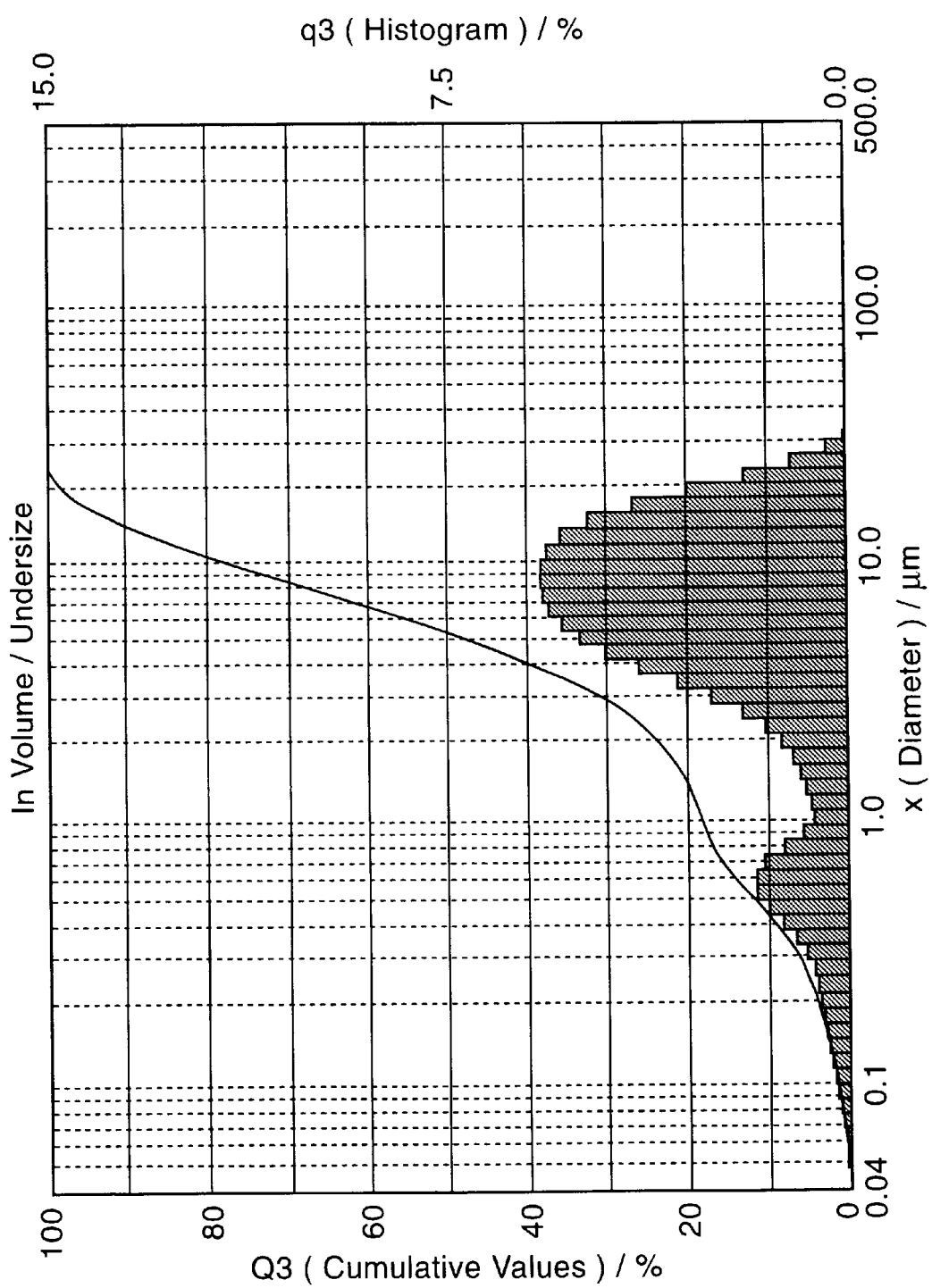
FIG. 4 shows, graphically, the result of measurement of Zeosil 1165 MP by the laser diffraction method.
Figure 5:
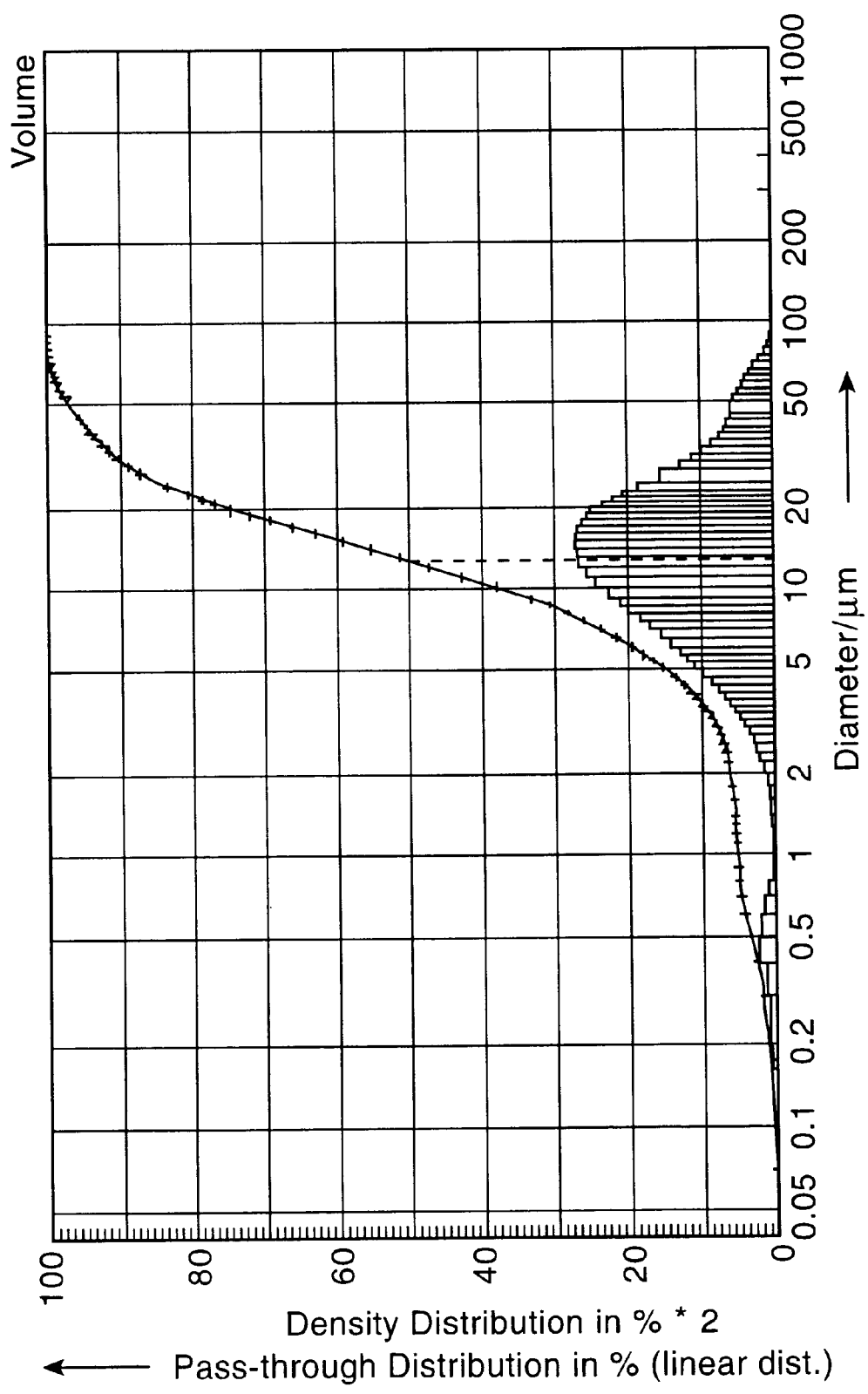
FIG. 5 shows, graphically, the result of measurement of Perkasil KS 408 by the laser diffraction method.

FIGS. 1–4 show the results and measurements of the particle size distribution of precipitated silicas according to the invention and of comparison silicas.

The curves show a first maximum in the particle size distribution in the range of 1.0–100 µm, and a further maximum in the range of <1.0 µm. The peak in the range of 1.0–100 µm indicates the proportion of non-comminuted silica particles after the ultrasonic treatment. These quite coarse particles are poorly dispersed in the rubber mixtures. The second peak of significantly smaller particle size (<1.0 µm) indicates that portion of particles of the silica which has been comminuted during the ultrasonic treatment. These very small particles are excellently dispersed in rubber mixtures.

The wK coefficient is thus the ratio of the peak height of the non-degradable particles (B), the maximum of which lies in the range of 1.0–100 µm, to the peak height of the degraded particles (A), the maximum of which lies in the range of <1.0 mm.

The graph according to FIG. 6 illustrates the relationships.

$$wk = \frac{\text{Peak height of the non-degradable particles (B)}}{\text{Peak height of the degraded particles (A)}}$$

$$A' = \text{range from 0 to} < 1.0\,\mu\text{m}$$

$$B' = \text{range } 1.0\,\mu\text{m}-100\,\mu\text{m}$$

The wk coefficient is therefore a measure of the "degradability" (=dispersibility) of the precipitated silica. Therefore: A precipitated silica is more readily dispersible the smaller the wk coefficient and the more particles are degraded during incorporation into rubber.

The silicas according to the invention have wk coefficients of <3.4. The maximum in the particle size distribution of the non-degradable particles of the precipitated silica according to the invention lies in the range of 1.0–100 µm. The maximum in the particle size distribution of the degraded particles of the precipitated silica according to the invention lies in the range of <1.0 µm.

Known precipitated silicas have significantly higher wk coefficients and other maxima in the particle size distributions measured with the CILAS Granulometer 1064 L and are therefore more poorly dispersible.

The following substances are employed in the examples:

| | |
|---|---|
| First Latex Crepe | Natural rubber |
| CBS | Benzothiazyl-2-cyclohexylsulfenamide |
| TMTM | Tetramethylthiuram monosulfide |
| SI 69 | Bis (3-triethoxysilylpropyl) tetrasulfane (Degussa AG) |
| DEG | Diethylene glycol |
| VSL 1955 S 25 | styrene/butadiene rubber based on |

-continued

| | |
|---|---|
| | solution polymerization with a styrene content of 25% and a vinyl content of 55% (Bayer AG) |
| DPG | Diphenylguanidine |
| Vulkanox 4020 | N-(1,3-Dimethylbutyl)-N'-phenyl-p-phenylenediamine (Bayer AG) |
| Protector G 35 | Ozone protection wax |
| ZBED | Zinc dibenzyldithiocarbamate |
| Buna CB 24 | Butadiene rubber from Bunawerke Hüls |
| Naftolen ZD | Aromatic mineral oil plasticizer |

Comparison products

| | |
|---|---|
| Ultrasil VN 2 | Silica from Degussa with an $N_2$-surface area of approx. 125 $m^2/g$ |
| Ultrasil VN 3 | Silica from Degussa with an $N_2$-surface area of approx. 115 $m^2/g$ |
| Ultrasil 3370 | Silica from Degussa with an $N_2$-surface area of approx. 175 $m^2/g$ |
| Ultrasil 3380 | Silica from Degussa with an $N_2$-surface area of approx. 175 $m^2/g$ |
| Hisil 233 | Silica from PPG with an $N_2$surface area of approx. 150 $m^2/g$ |
| KS 300 | Silica from Akzo with an $N_2$surface area of approx. 125 $m^2/g$ |
| KS 404 | Silica from Akzo with an $N_2$surface area of approx. 175 $m^2/g$ |
| KS 408 | Silica from Akzo with an $N_2$surface area of approx. 175 $m^2/g$ |
| Zeosil 1165 MP | Silica from Rhone-Poulenc with an $N_2$surface area of approx. 150 $m^2/g$ |

Example 1

Preparation of a precipitated silica in the $N_2$ surface area range of 120–140 $m^2/g$ 17.6 l water are mixed with soda water-glass (modulus 3.42, density 1.346) up to pH 8.5, while stirring, in a vat and the mixture is heated to 78° C. 1.18 l water-glass and 0.28 l 50% sulfuric acid are added in the course of 20 min with constant stirring, while maintaining the temperature of 78° C. and the pH of 8.5. The addition of water-glass and acid is then stopped for 60 min. Thereafter, further water-glass solution and sulfuric acid are added until, after 138 min, a solids content of 75 g/l is reached.

Sulfuric acid is then added until a pH of between 3 and 5 is reached. The solid is separated off on a filter press, washed and then subjected to brief or long-term drying, and if appropriate ground.

The resulting precipitated silica has an $N_2$ surface area of 127 $m^2/g$, a CTAB surface area of 120 $m^2/g$, a DBP index of 252 ml/100 g and a Sears index of 10.5.

Example 2

Preparation of a precipitated silica in the $N_2$ surface area range of 140–160 $m^2/g$ 45,5 $m^3$ water are heated to 95° C. in a vat, while stirring. Soda water-glass (modulus 1.342, density 1.348) and 96% sulfuric acid are added, with constant stirring and while maintaining the temperature of 95° C., at a pH of 7.5 in the course of 48 min in an amount such that a solids content of 56 g/l is reached after 48 min. Sulfuric acid is then added until a pH of between 3 and 5 is reached. The solid is separated off on a filter press, washed and then subjected to brief or long-term drying, and if appropriate ground.

The resulting precipitated silica has an $N_2$ surface area of 141 $m^2/g$, a CTAB surface area of 121 $m^2/g$, a DBP index of 288 ml/100 g and a Sears index of 7.5.

Example 3

Preparation of a precipitated silica in the $N_2$ surface area range of 160–180 $m^2/g$ 20,6 l water are mixed with soda water-glass (modulus 3.42, density 1.350) until pH 8.5 is reached, while stirring, in a vat and the mixture is heated to 62° C. 5.6 l water-glass and 1.3 l 50% sulfuric acid are added, with constant stirring and while maintaining the temperature of 62° C. and the pH of 8.5, in the course of 158 min in an amount such that a solids content of 76 g/l is reached after 158 min. Sulfuric acid is then added until a pH of between 3 and 5 is reached. The solid is separated off on a filter press, washed and then subjected to brief or long-term drying, and if appropriate ground.

The resulting precipitated silica has an $N_2$ surface area of 171 $m^2/g$, a CTAB surface area of 139 $m^2/g$, a DBP index of 275 ml/100 g and a Sears index of 17.6.

Example 4

Preparation of a precipitated silica in the $N_2$ surface area range of 180–200 $m^2/g$ 46 $m^3$ water are mixed with soda water-glass (modulus 1.342, density 1.348) until pH 9 is reached, while stirring, in a vat and the mixture is heated to 80° C. Soda water-glass and 96% sulfuric acid are added, with constant stirring and while maintaining the temperature of 80° C, at a pH of 9.0 in the course of 67 min in an amount such that a solids content of 89 g/l is reached after 67 min. Sulfuric acid is then added until a pH of between 3 and 5 is reached. The solid is separated off on a filter press, washed and then subjected to brief or long-term drying, and if appropriate ground.

The resulting precipitated silica has an $N_2$ surface area of 185 $m^2/g$, a CTAB surface area of 163 $m^2/g$, a DBP index of 269 ml/100 g and a Sears index of 17.0.

Example 5

Preparation of a precipitated silica in the $N_2$ surface area range of 200–300 $m^2/g$ 46 $m^3$ water are mixed with soda water-glass (modulus 1.342, density 1.348) until pH 9 is reached, while stirring, in a vat and the mixture is heated to 69 ° C. Soda water-glass and 96% sulfuric acid are added, with constant stirring and while maintaining the temperature of 69° C., at a pH of 9.0 in the course of 76 min in an amount such that a solids content of 96.5 g/l is reached after 76 min. Further sulfuric acid is then added until a pH of between 3 and 5 is reached. The solid is separated off on a filter press, washed and then subjected to brief or long-term drying, and if appropriate ground.

The resulting precipitated silica has an $N_2$ surface area of 218 $m^2/g$, a CTAB surface area of 186 $m^2/g$, a DBP index of 299 ml/100 g and a Sears index of 21.6.

Example 6

Determination of the wk coefficient with the Cilas Granulometer 1064 L on a silica according to the invention with a CTAB surface area of 120 $m^2/g$ and comparison with standard silicas in the same surface area range. The values B, A, B' and A' according to graph 1 are additionally given.

| Product name | CTAB surface area | wk coefficient | B | A | B'[μm] | A'[μm] |
|---|---|---|---|---|---|---|
| KS 300 | 120 | 9.3 | 28 | 3 | 13.9 | 0.5 |
| VN 2 | 120 | 15.3 | 29 | 1.9 | 12 | 0.4 |
| KS ex. 1 | 120 | 1.2 | 38 | 32 | 5.0 | 0.75 |

Example 7

Determination of the wk coefficient with the Cilas Granulometer 1064 L on a silica according to the invention with a CTAB surface area in the range of 130–150 $m^2/g$ and comparison with standard silicas in the same surface area range. The values B, A, B' and A' according to graph 1 are additionally given.

| Product name | CTAB surface area | wk coefficient | B | A | B'[μm] | A'[μm] |
|---|---|---|---|---|---|---|
| Hisil 233 | 138 | 13.3 | 32 | 2.4 | 14.9 | 0.5 |
| KS ex. 2 | 139 | 1.3 | 41 | 31.2 | 4.5 | 0.7 |

Example 8

Determination of the wk coefficient with the Cilas Granulometer 1064 L on a silica according to the invention with a CTAB surface area in the range of 150–180 $m^2/g$ and comparison with standard silicas in the same surface area range. The values B, A, B' and A' according to graph 1 are additionally given.

| Product name | CTAB surface area | wk coefficient | B | A | B'[μm] | A'[μm] |
|---|---|---|---|---|---|---|
| VN 3 | 165 | 12.1 | 27.5 | 2.3 | 13 | 0.45 |
| 3370 | 165 | 14.5 | 40.5 | 2.8 | 14 | 0.65 |
| 3380 | 165 | 3.5 | 38.5 | 11.0 | 10 | 0.65 |
| 1165 MP | 160 | 3.4 | 38.7 | 11.4 | 8.5 | 0.6 |
| KS 404 | 160 | 18.3 | 33 | 1.8 | 16 | 0.6 |
| KS 408 | 160 | 12.9 | 27 | 2.1 | 14 | 0.6 |
| KS ex. 3 | 163 | 1.2 | 33 | 27.5 | 5 | 0.4 |
| KS ex. 4 | 163 | 1.1 | 31 | 27.5 | 4.1 | 0.5 |
| KS ex. 5 | 186 | 2.1 | 38 | 18 | 8.3 | 0.5 |

The precipitated silica 3370 shown in the table corresponds to the precipitated silica according to EP-A 0 647 591, example 3. It has a substantially poorer WK coefficient than the precipitated silica according to the invention. Furthermore, the Phillips value—as can be seen from example 10—is significantly poorer. This means: The precipitated silica according to the invention has a significantly better dispersibility and therefore a lower abrasion in the tire mixture.

Example 9

Measurement results of the precipitated silica according to the invention from example x and x in comparison with standard silicas (see FIGS. 1–4 in the appendix).

Example 10

Silica according to the invention from example 4 in comparison with standard silicas in L-SBR/BR running tread mixtures:

|  | 1 | 2 | 3 |
|---|---|---|---|
| Buna VSL 5025-1 | 96 | 96 | 96 |
| Buna CB 24 | 30 | 30 | 30 |
| Ultrasil VN3 | 80 | — | — |
| Ultrasil 3370 | — | 80 | — |
| Silica according to the invention (example 4) | — | — | 80 |
| X 50 S | 12.8 | 12.8 | 12.8 |
| ZnO RS | 3 | 3 | 3 |
| Stearic acid | 2 | 2 | 2 |
| Naftolen ZD | 10 | 10 | 10 |
| Vulkanox 4020 | 1.5 | 1.5 | 1.5 |
| Protektor G 35 | 1 | 1 | 1 |
| CBS | 1.5 | 1.5 | 1.5 |
| DPG | 2 | 2 | 2 |
| TBZTD | 0.2 | 0.2 | 0.2 |
| Sulfur | 1.5 | 1.5 | 1.5 |
| Mooney viscosity ML (1 + 4) | 78 | 78 | 75 |
| Vulcanisate data: 165 C/$t_{95}$ % |  |  |  |
| Elongation at break [%] | 380 | 350 | 400 |
| tanδ 0° C. | 0.427 | 0.428 | 0.437 |
| tanδ 60° C. | 0.132 | 0.133 | 0.129 |
| Dispersion coefficient [%] | 61.6 | 82.7 | 97.7 |
| Phillips value | 4 | 6 | 9 |

The silica according to the invention from example 4 has a lower viscosity, higher elongation at break, higher wet antiskid properties at a low rolling resistance and, particularly importantly, a higher dispersion coefficient compared with both Ultrasil VN3 and Ultrasil 3370. Ultrasil 3370 is described in the document EP-A 0 647 591, example 3. A higher dispersion coefficient means a lower abrasion, and a lower abrasion means a longer life of the tires.

Example 11

Silica according to the invention from example 1 in comparison with standard silica in an NR/SBR mixture for the tire carcass:

|  | 1 | 2 |
|---|---|---|
| SMR 20 | 60 | 60 |
| Krynol 1712 | 55 | 55 |
| Ultrasil VN2 | 50 | — |
| Silica according to the invention (example 1) | — | 50 |
| X 50 S | 3 | 3 |
| ZnO RS | 3 | 3 |
| Stearic acid | 1 | 1 |
| Sunpar 150 | 6 | 6 |
| Koresin (lozenges) | 4 | 4 |
| DPG | 1.5 | 1.5 |
| CBS | 1.5 | 1.5 |
| Sulfur | 2.2 | 2.2 |
| Mooney viscosity ML (1 + 4) | 38 | 34 |
| Vulcanisate data: 160 C/$t_{95}$ % |  |  |
| 300% modulus [MPa] | 5.5 | 6.0 |
| Elongation at break [%] | 490 | 570 |
| Heat Build Up DT Center [°C.] | 65 | 56 |
| Dispersion coefficient [%] | 78.1 | 96.7 |
| Phillips value | 6 | 9 |

The silica according to the invention from example 1 leads to lower viscosities, higher modulus values, a higher elongation at break, a lower heat build up and a higher dispersion coefficient compared with Ultrasil VN2, which has a similar surface area.

This application claims priority from DE 197 40 440.5, filed Sep. 15, 1997, the entire disclosure of which is incorporated herein by reference.

What we claim is:

1. Precipitated silica, characterized by the following physico-chemical parameters:

| | |
|---|---|
| BET surface area | 120–300 $m^2/g$ |
| CTAB surface area | 100–300 $m^2/g$ |
| BET/CTAB ratio | 0.8–1.3 |
| Sears index (consumption of 0.1 N NaOH) | 6–25 ml |
| DBP index | 150–300 g/100 g |
| wk coefficient | <3.4 |
| Particle size of the degraded particles | <1.0 $\mu m$ |
| Particle size of the non-degradable particles | 1.0–100 $\mu m$. |

2. A process for the preparation of precipitated silica having the following physico-chemical parameters:

| | |
|---|---|
| BET surface area | 120–300 $m^2/g$ |
| CTAB surface area | 100–300 $m^2/g$ |
| BET/CTAB ratio | 0.8–1.3 |
| Sears index (consumption of 0.1 N NaOH) | 6–25 ml |
| DBP index | 150–300 g/100 g |
| wk coefficient | <3.4 |
| Particle size of the degraded Particles | <1.0 $\mu m$ |
| Particle size of the non-Degradable particles | 1.0–100 $\mu m$ | comprising:
reacting an alkali metal silicate with one or more mineral acids at temperatures of 60°–95° C. at a pH of 7.0–11.0 with continuous stirring,
continuing the reacting step up to a solids concentration of 40 g–110 g,
adjusting the pH to a value between 3 and 5,
filtering off the precipitated silica, and
washing, drying, optionally grinding and optionally granulating the precipitated silica.

3. The process according to claim 2, comprising at least one condition selected from the group consisting of the solids concentration is less than 80 g/l, the temperature is less than 80° C., the precipitation time is less than 76 minutes the precipitation is interrupted and a dilute or concentrated mineral acid is employed.

4. The process according to claims 2 or 3, wherein the following conditions are maintained for the preparation of a precipitated silica having a BET surface area of 120 to 140 $m^2/g$ and a wk coefficient of less than 3.4:
Solids concentration: 68 to 85 g/l
Temperature: 74° to 82° C.
pH: 8 to 9, and said process comprises:
adding water-glass and sulfuric acid over a period of 15 to 25 minutes,
interrupting the adding step for 30 to 90 minutes, and
adding water-glass and sulfuric acid over a period of 50 to 70 minutes,
where total precipitation time is 130 to 140 minutes.

5. The process according to claims 2 or 3, wherein the following conditions are maintained for the preparation of a precipitated silica having a BET surface area of 140 to 160 $m^2/g$ and a WK coefficient of less than 3.4:
Solids concentration: 40 to 60 g/l
Temperature: 88° to 96° C.
pH: 7 to 9, and said process comprises:
adding water-glass and sulfuric acid over a period of 38 to 50 minutes.

6. The process according to claims 2 or 3, wherein the following conditions are maintained for the preparation of a precipitated silica having a BET surface area of 160 to 180 $m^2/g$ and a wk coefficient of less than 3.4:
Solids concentration: 68 to 84 g/l
Temperature: 59° to 65° C.
pH: 8 to 9, wherein said process comprises:
adding water-glass and sulfuric acid over a period of 150 to 170 minutes.

7. The process according to claims 2 or 3, wherein the following conditions are maintained for the preparation of a precipitated silica having a BET surface area of 180 to 200 $m^2/g$ and a wk coefficient of less than 3.4:
Solids concentration: 74 to 94 g/l
Temperature: 75° to 83° C.
pH: 8 to 10, wherein said process comprises:
adding water-glass and sulfuric acid over a period of 60 to 70 minutes.

8. The process according to claims 2 or 3, wherein the following conditions are maintained for the preparation of a precipitated silica having a BET surface area of 200 to 300 $m^2/g$ and a wk coefficient of less than 3.4:
Solids concentration: 70 to 110 g/l
Temperature: 60° to 76° C.
pH: 8 to 10, wherein said process comprises:
adding water-glass and sulfuric acid over a period of 60 to 86 minutes.

9. The process according to claims 2 or 3, comprising:
employing at least one member selected from the group consisting of chamber filter presses, membrane filter presses, belt filters, rotary filters, and automatic membrane filter presses.

10. The process according to claims 2 or 3, comprising:
employing a dryer selected from the group consisting of a flow dryer, rack dryer, flash dryer and spin-flash dryer.

11. The process according to claims 2 or 3, comprising:
drying liquefied filter cakes in a spray dryer with at least one member selected from the group consisting of an atomizer, a two-component nozzle, a one-component nozzle and an integrated fluidized bed.

12. The process according to claims 2 or 3, comprising:
granulating the precipitated silica with a roller compactor.

13. Precipitated silicas according to claim 1, comprising:
a surface modified with at least one organosilane of formulas I to III:

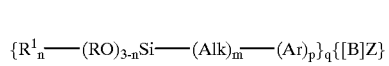
(I)

(II)

-continued

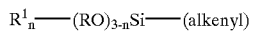
(III)

in which the symbols denote

Z: —SCN, —SH, —Cl, $NH_2$ (if q=1) or —Sx— (if q=2),

R and $R_1$: an alkyl group having 1 to 4 carbon atoms, the phenyl radical, wherein all the radicals R and $R_1$ can each have the same or a different meaning, R: a $C_1$–$C_4$-alkyl, $C_1$–$C_4$-alkoxy group, N: 0; 1 or 2, Alk: a divalent straight-chain or branched hydrocarbon radical having 1 to 6 carbon atoms, m: 0 or 1, Ar: an arylene radical having 6 to 12 C atoms, preferable 6 C atoms, P: 0 or 1, with the proviso that p and n do not simultaneously denote 0

X: a number from 2 to 8, alkyl: a monovalent straight-chain or branched unsaturated hydrocarbon radical having 1 to 20 carbon atoms, preferably 2 to 8 carbon atoms, alkenyl: a monovalent straight-chain or branched unsaturated hydrocarbon radical having 2 to 20 carbon atoms, preferably 2 to 8 carbon atoms.

14. The process for the preparation of the silicas according to claim 13, comprising:

modifying the precipitated silicas with organosilanes in mixtures of 0.5 to 50 parts, based on 100 parts of precipitated silica, carrying out the reaction between precipitated silica and organosilane during preparation of the mixture or externally by spraying on and subsequent heat treatment of the mixture, or by mixing the silane and the silica suspension with subsequent drying and heat treatment.

15. Vulcanizable rubber mixtures and vulcanizates which comprise, as a filler, the precipitated silica according to claim 1.

* * * * *